United States Patent
Nakamura

(10) Patent No.: US 7,982,971 B2
(45) Date of Patent: Jul. 19, 2011

(54) ZOOM LENS SYSTEM AND IMAGE PICKUP APPARATUS INCLUDING THE SAME

(75) Inventor: Tomoyuki Nakamura, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/845,304

(22) Filed: Jul. 28, 2010

(65) Prior Publication Data

US 2011/0038056 A1    Feb. 17, 2011

(30) Foreign Application Priority Data

Aug. 17, 2009    (JP) .................................. 2009-188462

(51) Int. Cl.
G02B 15/14    (2006.01)
(52) U.S. Cl. ........................................ 359/688
(58) Field of Classification Search .................. 359/683, 359/688

See application file for complete search history.

(56) References Cited

U.S. PATENT DOCUMENTS

| 5,831,771 A | 11/1998 | Suzuki |
| 6,825,990 B2 | 11/2004 | Yoshimi et al. |
| 2011/0037878 A1* | 2/2011 | Wakazono et al. ........ 348/240.3 |
| 2011/0037880 A1* | 2/2011 | Sakamoto ................. 348/240.3 |

* cited by examiner

Primary Examiner — Scott J Sugarman
(74) Attorney, Agent, or Firm — Rossi, Kimms & McDowell LLP

(57) ABSTRACT

A zoom lens system includes, in order of from an object side to an image side: a first lens unit which does not move for zooming; a second lens unit moving during zooming; a third lens unit moving during zooming; and a fourth lens unit which does not move for zooming. The first lens unit includes a negative lens, a positive lens, a positive lens, and a positive lens, and when an Abbe number ν and a partial dispersion ratio θ of a material of the negative lens are denoted respectively by νn and θn, an average value of Abbe numbers ν and an average value of partial dispersion ratios θ of materials of the positive lenses are denoted respectively by νpa and θpa, and a refractive power of the negative lens is denoted by φn, the following expressions are satisfied: $-1.75 \times 10^{-3} < (\theta pa - \theta n)/(\nu pa - \nu n)$; and $9.1 \times 10^{-3}(1/mm) < |\phi n|$.

5 Claims, 8 Drawing Sheets

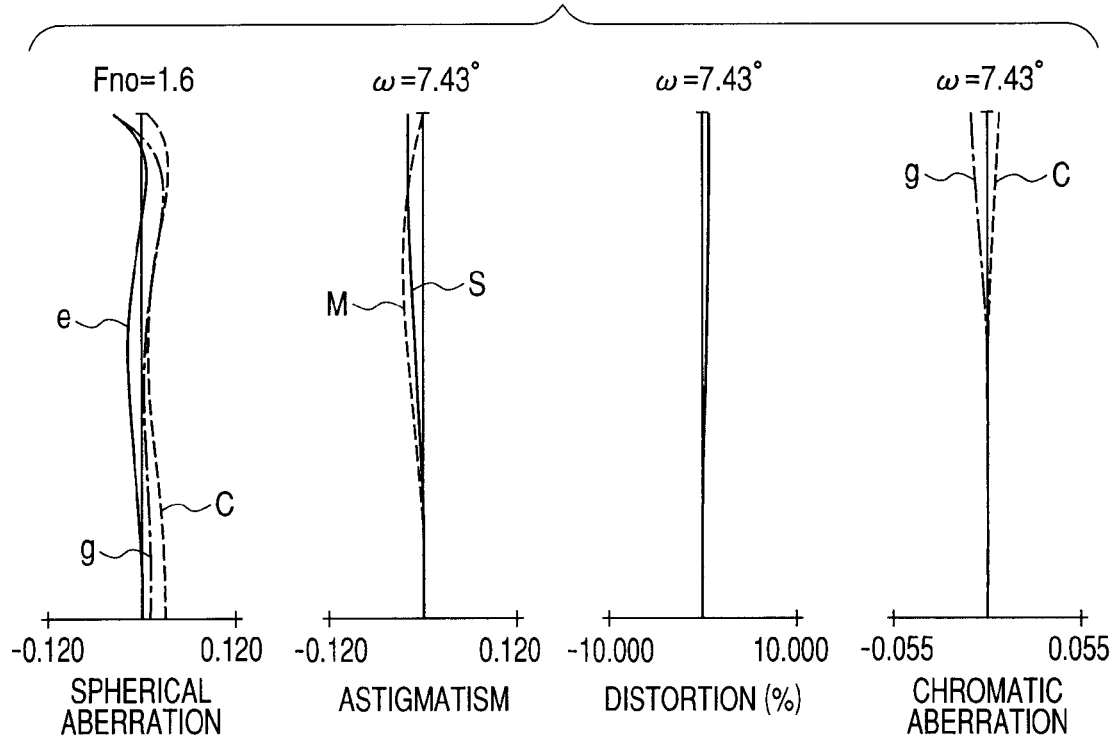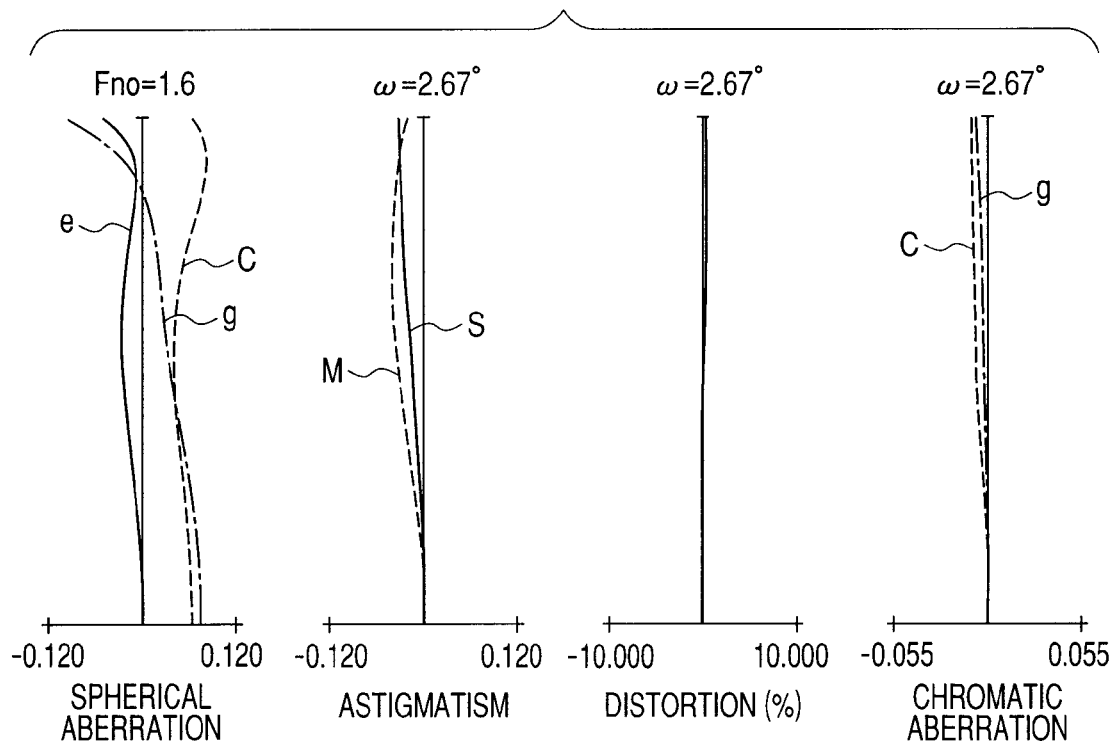

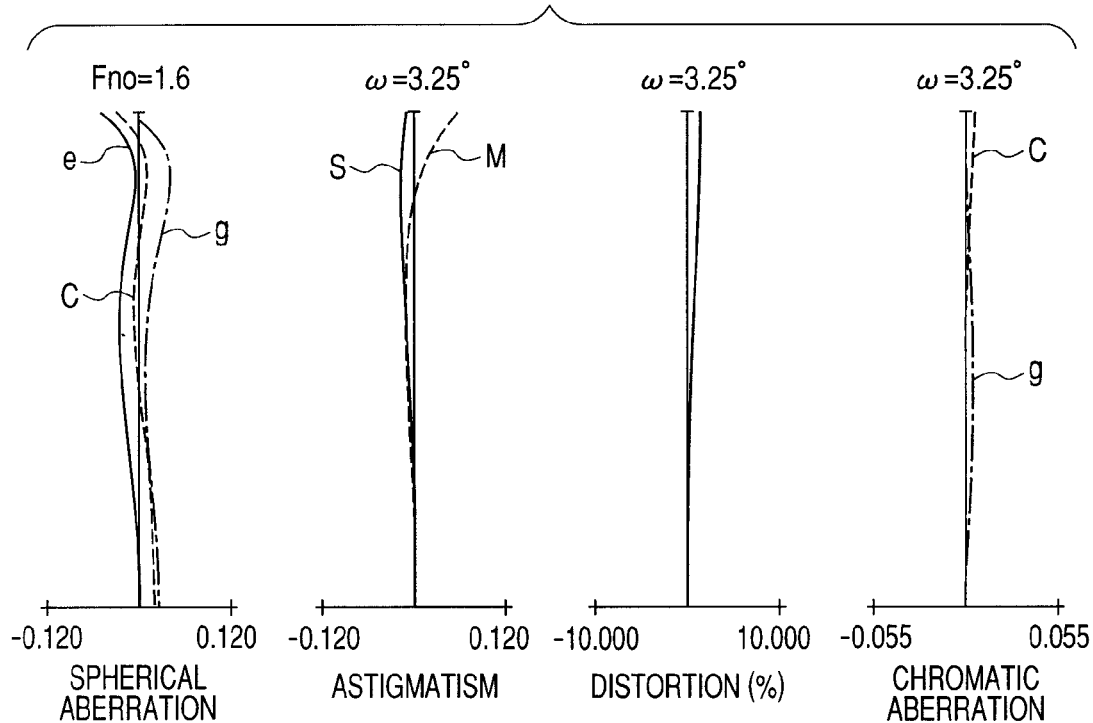
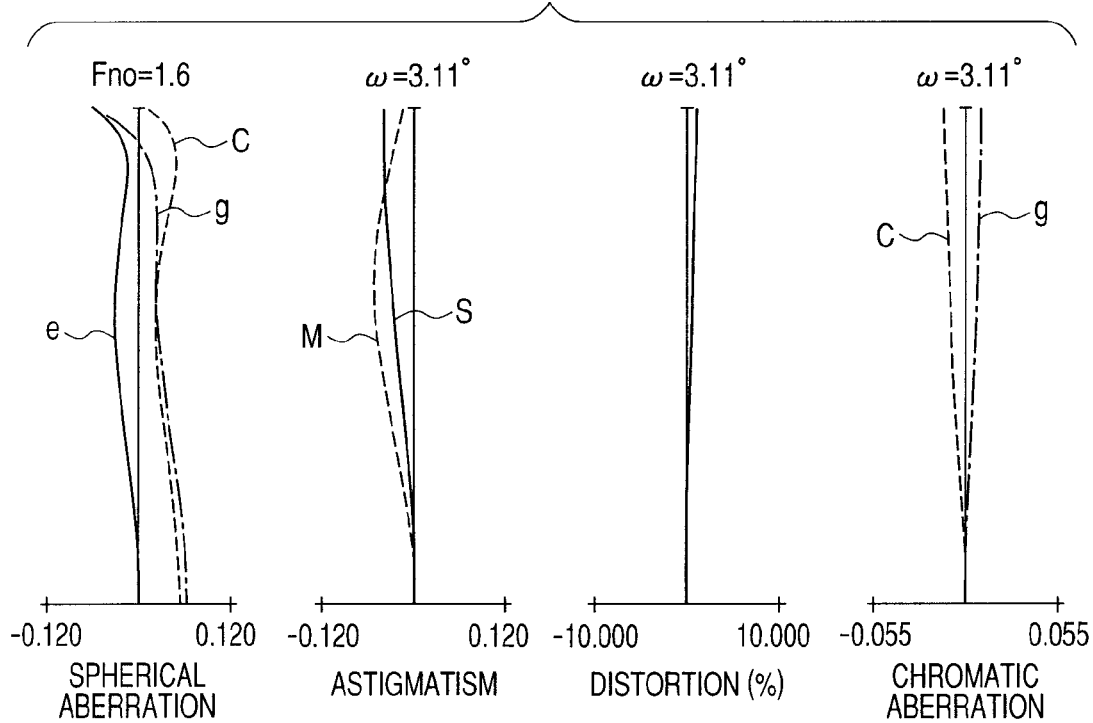

ZOOM LENS SYSTEM AND IMAGE PICKUP APPARATUS INCLUDING THE SAME

BACKGROUND OF THE INVENTION

1. Field of the Invention

The present invention relates to a zoom lens system, which is suitable for use in a broadcasting television (TV) camera, a video camera, a digital still camera, and a silver-halide camera, and also to an image pickup apparatus including the zoom lens system.

2. Description of the Related Art

In recent years, there have been demanded a zoom lens system having a high zoom ratio and high optical performance for image pickup apparatus such as a television (TV) camera, a silver-halide camera, a digital camera, and a video camera. As the zoom lens system having a high zoom ratio, there is known a four-unit zoom lens system which includes a first lens unit having a positive refractive power, a second lens unit having a negative refractive power for zooming, a third lens unit having a negative refractive power for correcting image plane variation, and a fourth lens unit having a positive refractive power. As to this four-unit zoom lens system, there is known a four-unit zoom lens system having a high zoom ratio, in which an optical material having an anomalous dispersion characteristic is used, so that chromatic aberration is corrected appropriately and a high optical performance is provided (see U.S. Pat. Nos. 5,831,771 and 6,825,990).

A four-unit zoom lens system having a structure described above may support a high zoom ratio relatively easily. In order to obtain high optical performance in this four-unit zoom lens system, it is important to correct longitudinal chromatic aberration at the telephoto end appropriately. It is easy to correct the longitudinal chromatic aberration appropriately if an optical material having an anomalous dispersion characteristic is used. However, it is difficult to correct the chromatic aberration appropriately by simply using a lens made of the optical material having an anomalous dispersion characteristic. In order to obtain high optical performance over the entire zoom range in the four-unit zoom lens system described above, it is an important factor to set appropriately a lens structure of the first lens unit which is fixed during zooming and a material of each lens included in the first lens unit. In this regard, in order to correct the longitudinal chromatic aberration appropriately on the telephoto side, it is important to set an appropriate difference between dispersions of materials of the positive lens and the negative lens in the first lens unit. If this setting is performed inappropriately, it is difficult to correct the longitudinal chromatic aberration appropriately at the telephoto end.

SUMMARY OF THE INVENTION

A zoom lens system according to the present invention includes, in order of from an object side to an image side: a first lens unit having a positive refractive power, which does not move for zooming; a second lens unit having a negative refractive power, which moves during zooming; a third lens unit having a negative refractive power, which moves during zooming; and a fourth lens unit having a positive refractive power, which does not move for zooming. Further, the first lens unit includes a negative lens, a positive lens, a positive lens, and a positive lens arranged in this order from the object side to the image side, and when an Abbe number $\nu$ and a partial dispersion ratio $\theta$ of a material of the negative lens in the first lens unit are denoted respectively by $\nu n$ and $\theta n$, an average value of Abbe numbers $\nu$ and an average value of partial dispersion ratios $\theta$ of materials of the positive lenses in the first lens unit are denoted respectively by $\nu pa$ and $\theta pa$, and a refractive power of the negative lens in the first lens unit is denoted by $\phi n$, conditions expressed by the following expressions are satisfied:

$$-1.75 \times 10^{-3} < (\theta pa - \theta n)/(\nu pa - \nu n); \text{ and}$$

$$9.1 \times 10^{-3} (1/mm) < |\phi n|.$$

Further features of the present invention will become apparent from the following description of exemplary embodiments with reference to the attached drawings.

BRIEF DESCRIPTION OF THE DRAWINGS

FIG. 2B is an aberration diagram of Numerical Embodiment 1 at an intermediate zoom position at the time of focusing at infinity.

FIG. 2C is an aberration diagram of Numerical Embodiment 1 at a telephoto end at the time of focusing at infinity.

FIG. 6B is an aberration diagram of Numerical Embodiment 3 at the intermediate zoom position at the time of focusing at infinity.

FIG. 6C is an aberration diagram of Numerical Embodiment 3 at the telephoto end at the time of focusing at infinity.

DESCRIPTION OF THE EMBODIMENTS

An object of the present invention is to provide a zoom lens system for easily realizing a high zoom ratio, correcting longitudinal chromatic aberration appropriately on a telephoto side, and easily realizing a small size and light weight, as well as an image pickup apparatus including the zoom lens system.

Hereinafter, embodiments of the present invention are described in detail with reference to the attached drawings. A zoom lens system according to the present invention includes a first lens unit having a positive refractive power, which is fixed for zooming, and a second lens unit having a negative refractive power, which is moved for zooming, which are arranged in order of from an object side to an image side. The zoom lens system further includes a third lens unit having a negative refractive power, which is moved for correcting image plane variation due to zooming, and a fourth lens unit having a positive refractive power, which is fixed for zooming. Here, a "lens unit is fixed for zooming" means that the lens unit does not driven for a purpose of zooming, but the lens unit may be moved for focusing if zooming and focusing are performed simultaneously.

Figure 1:
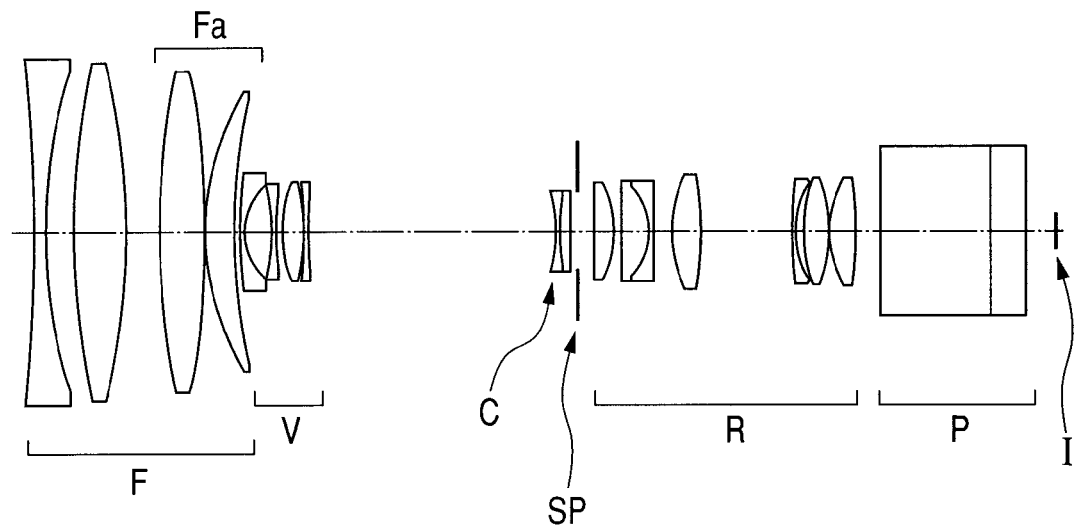
FIG. 1 is a lens cross sectional view of Numerical Embodiment 1 at a wide angle end at a time of focusing at infinity.
Figure 2A:
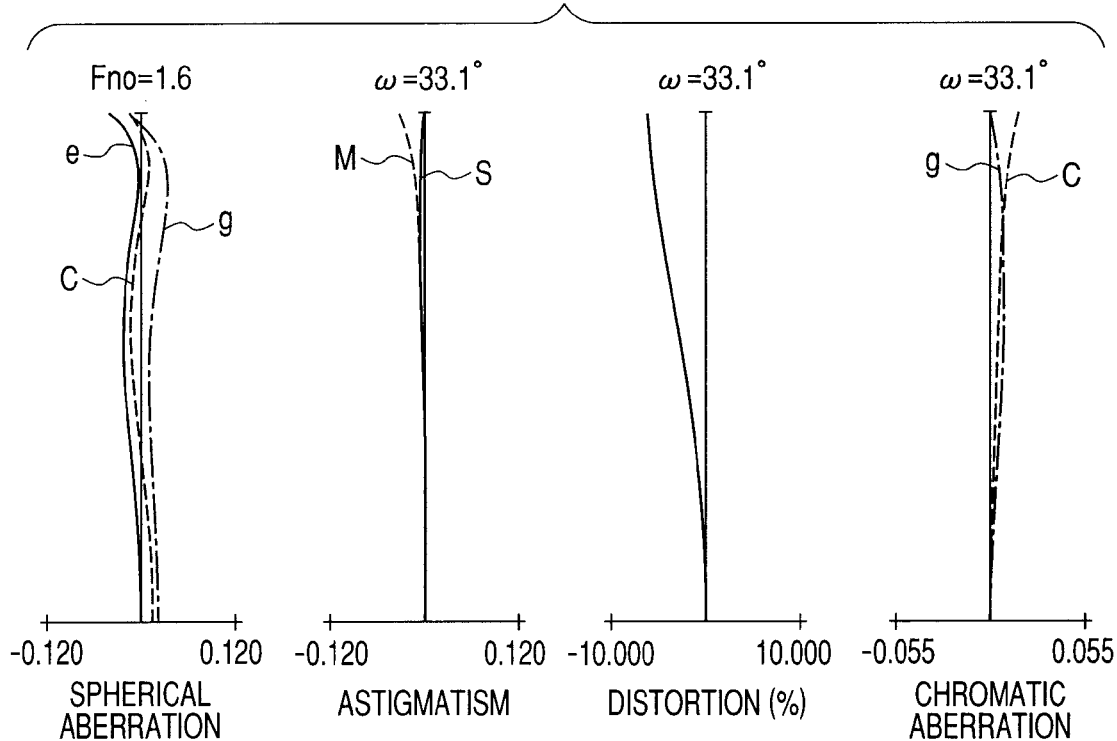
FIG. 2A is an aberration diagram of Numerical Embodiment 1 at the wide angle end at the time of focusing at infinity.
Figure 3:
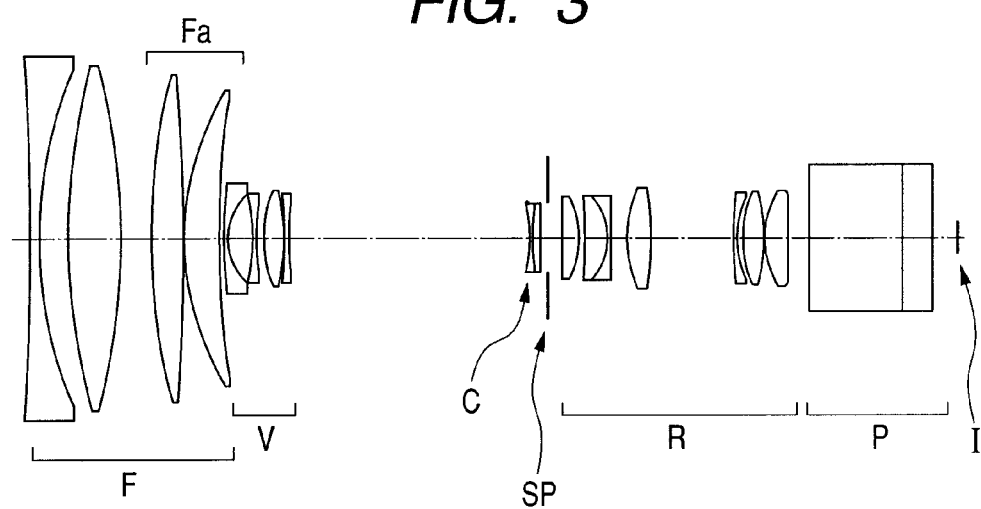
FIG. 3 is a lens cross sectional view of Numerical Embodiment 2 at the wide angle end at the time of focusing at infinity.
Figure 4A:
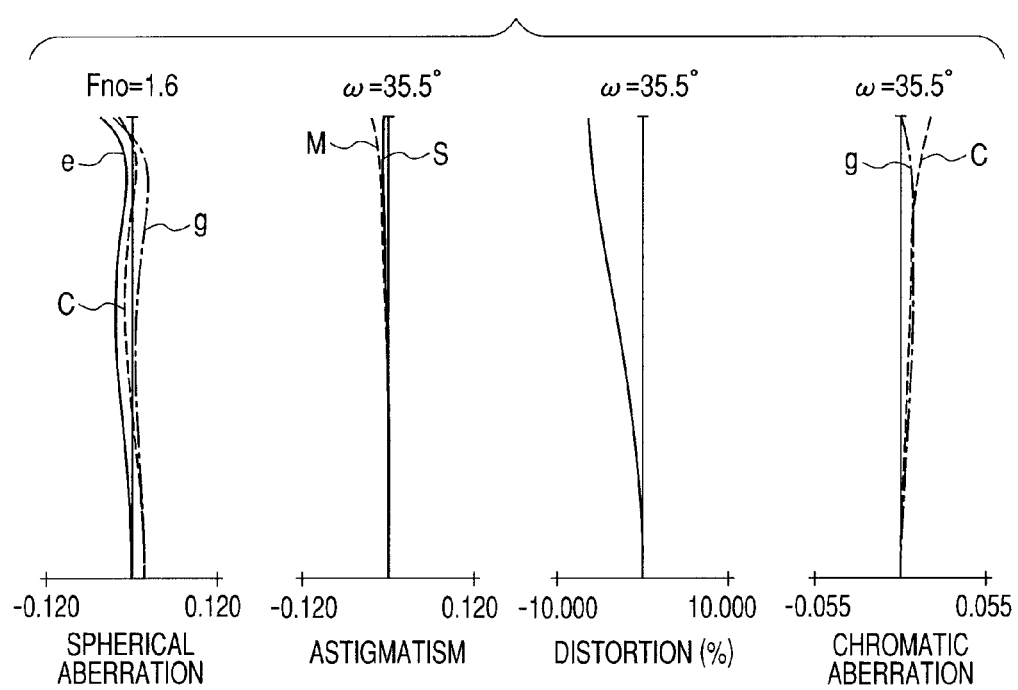
FIG. 4A is an aberration diagram of Numerical Embodiment 2 at the wide angle end at the time of focusing at infinity.
Figure 4B:
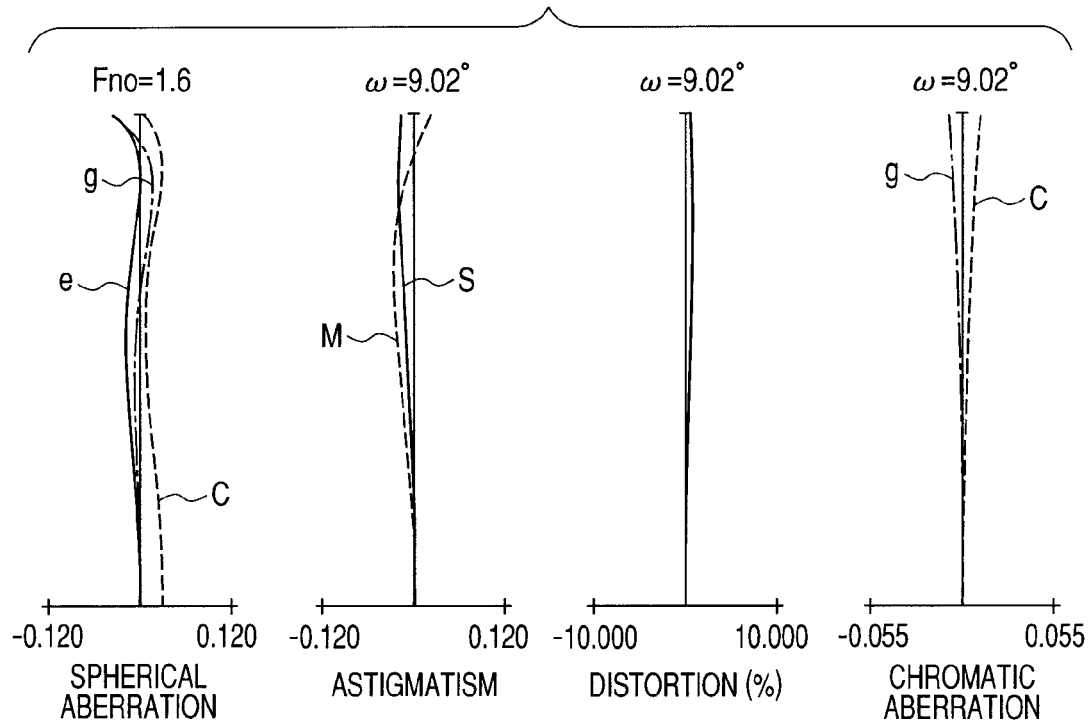
FIG. 4B is an aberration diagram of Numerical Embodiment 2 at the intermediate zoom position at the time of focusing at infinity.
Figure 4C:
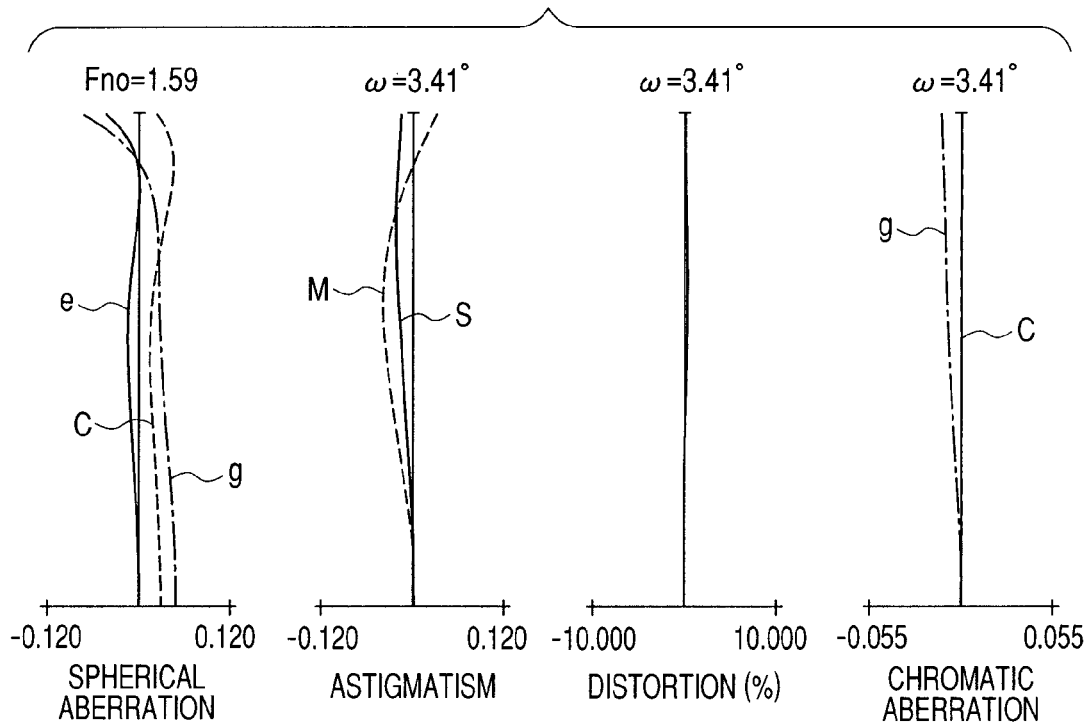
FIG. 4C is an aberration diagram of Numerical Embodiment 2 at the telephoto end at the time of focusing at infinity.
Figure 5:
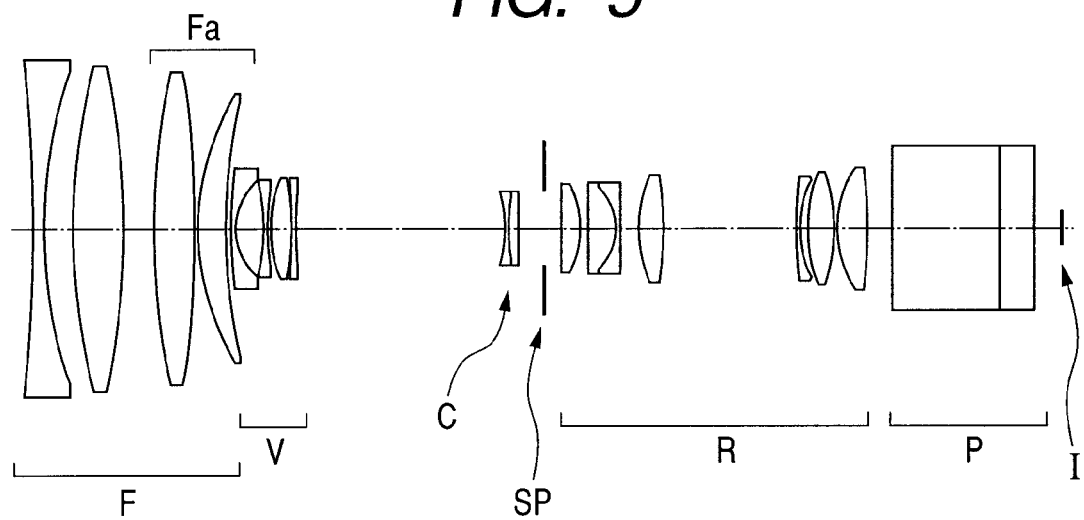
FIG. 5 is a lens cross sectional view of Numerical Embodiment 3 at the wide angle end at the time of focusing at infinity.
Figure 6A:
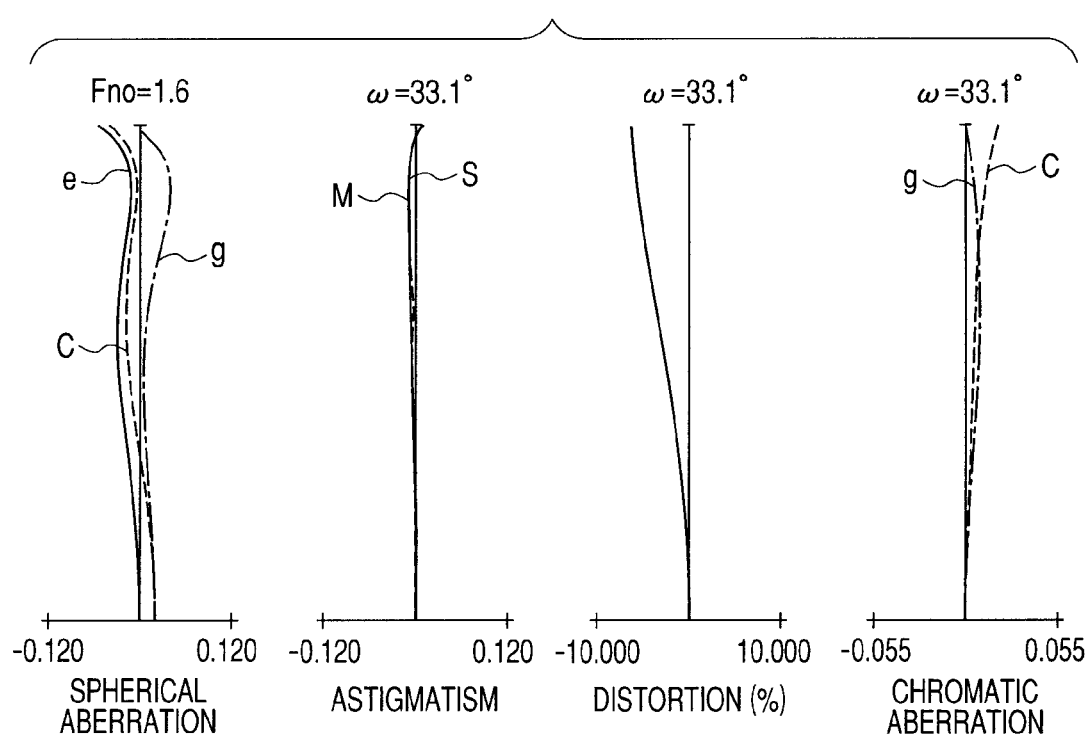
FIG. 6A is an aberration diagram of Numerical Embodiment 3 at the wide angle end at the time of focusing at infinity.

FIG. 1 is a cross sectional view of a zoom lens system of Embodiment 1 (Numerical Embodiment 1) of the present invention at a wide angle end (short focal length end with a focal length f=4.6 mm) at a time of focusing an infinite object. FIG. 2A, 2B, 2C are aberration diagrams of Numerical Embodiment 1 at the time of focusing the infinite object at the wide angle end, an intermediate zoom position (focal length f=23 mm), and a telephoto end (long focal length end with f=64.4 mm), respectively. It should be noted that the values of the focal length and the object distance are expressed by millimeters in the numerical embodiment. The same is true for the following embodiments. FIG. 3 is a lens cross sectional view of a zoom lens system according to Embodiment 2 (Numerical Embodiment 2) of the present invention at the wide angle end (f=4.2 mm) at the time of focusing the infinite object. FIGS. 4A, 4B, 4C are aberration diagrams of Numerical Embodiment 2 at the wide angle end, at the intermediate zoom position (focal length f=18.9 mm), and at the telephoto end with f=50.4 mm at the time of focusing at the infinite object. FIG. 5 is a lens cross sectional view of a zoom lens system according to Embodiment 3 (Numerical Embodiment 3) of the present invention at the wide angle end (f=4.6 mm) at the time of focusing at the infinite object. FIG. 6A, 6B, 6C are aberration diagrams of Numerical Embodiment 3 at the wide angle end, at the intermediate zoom position (focal length f=20.7 mm), and at the telephoto end with f=55.2 mm at the time of focusing at the infinite object.

In each of the lens cross sectional views, the left side is the subject (object) side (front), and the right side is the image side (rear). In the lens cross sectional views, a front lens unit as a first lens unit having a positive refractive power, which is fixed for zooming is denoted by F. A focus lens unit in the first lens unit F is denoted by Fa, which moves toward the object side when a focal point moves from an infinite object to a near object. A variator as a second lens unit for zooming having a negative refractive power is denoted by V, which is moved monotonously on the optical axis toward the image plane side so that zooming from the wide angle end to the telephoto end is performed. A compensator as a third lens unit having a positive refractive power is denoted by C, which moves in a non-linear manner on the optical axis toward the object side for correcting the image plane variation due to the zooming when the zooming from the wide angle end to the telephoto end is performed. The variator V and the compensator C constitute a zooming system. A diaphragm (aperture diaphragm) is denoted by SP. A fixed relay lens unit as a fourth lens unit having a positive refractive power is denoted by R, which has an imaging action. A color separation prism, an optical filter and the like are denoted by P, which is illustrated as a glass block in the diagram. An image plane is denoted by I, which corresponds to an image plane of a solid state image pickup element (photoelectric transducer) for receiving an image formed by the zoom lens system so as to perform photoelectric conversion.

In the aberration diagrams, an e-line, a d-line and a C-line are denoted by e, g and C, respectively. The meridional image plane and the sagittal image plane are denoted by M and S, respectively. The lateral chromatic aberration is expressed by the g-line and the C-line. A half field angle is denoted by ω, and an F number is denoted by fno. It should be noted that, in the embodiments described below, the wide angle end and the telephoto end mean zoom positions at which the zooming lens unit reaches each end in its mechanically movable range on the optical axis.

In the zoom lens system of each embodiment, the first lens unit F includes a negative lens, a positive lens, a positive lens, and a positive lens in order of from the object side to the image side. An Abbe number ν and a partial dispersion ratio θ of a material of the negative lens in the first lens unit F are denoted by νn and θn, respectively. An average value of the Abbe numbers ν and an average value of the partial dispersion ratios θ of materials of the positive lenses in the first lens unit F are denoted by νpa and θpa, respectively. A refractive power of the negative lens in the first lens unit F is denoted by φn. Then, the conditions expressed by the following expressions are satisfied.

$$-1.75 \times 10^{-3} < (\theta pa - \theta n)/(\nu pa - \nu n) \quad (1)$$

$$9.1 \times 10^{-3} (1/mm) < |\phi n| \quad (2)$$

The zoom lens system in each embodiment is characterized in that a lens structure of the first lens unit F and a condition of a dispersion characteristic of a material of each lens are appropriately defined. Here, the conditional expression (1) expresses a condition for appropriately correcting the secondary spectrum of the longitudinal chromatic aberration on the telephoto side. In the zoom lens system of each embodiment, the lens structure of the first lens unit F and the dispersion characteristic of the lens material are important factors for appropriately correcting the secondary spectrum of the longitudinal chromatic aberration at the telephoto end. If the conditional expression (1) is satisfied, remaining amount of the secondary spectrum of the longitudinal chromatic aberration in the first lens unit F is reduced, so that the secondary spectrum of the longitudinal chromatic aberration at the telephoto end is reduced.

Figure 7:
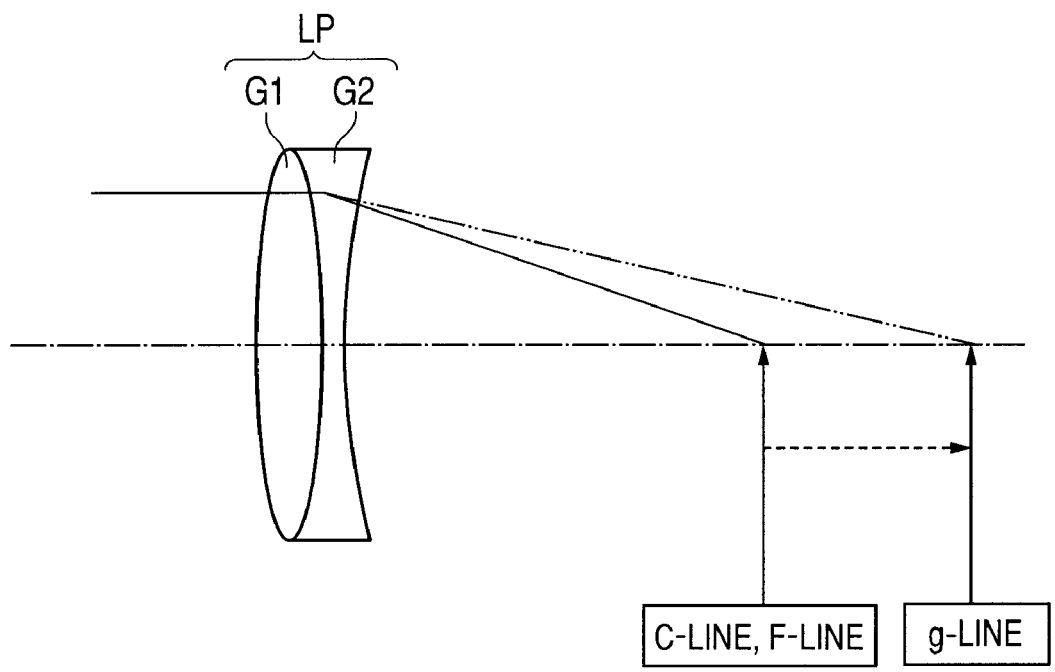
FIG. 7 is a schematic diagram concerning two-color achromatization and secondary spectrum remains of a positive lens unit.
Figure 8:
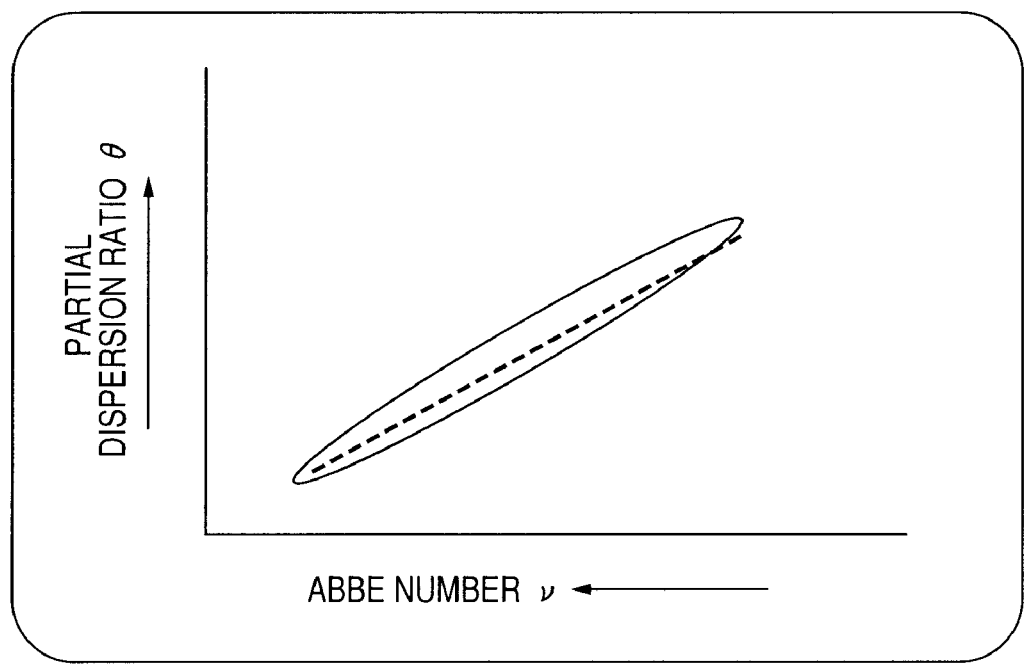
FIG. 8 is a schematic diagram of a distribution of an Abbe number $\nu$ and a partial dispersion ratio $\theta$ of optical materials.

FIG. 7 is a schematic diagram concerning two-color achromatization and secondary spectrum remains of a lens unit LP having a positive refractive power. FIG. 8 is a schematic diagram of a distribution of an Abbe number ν and a partial dispersion ratio θ of existing optical materials. Here, the Abbe number ν and the partial dispersion ratio θ are respectively expressed by the following expressions:

$$\nu = (Nd-1)/(NF-NC) \quad (a)$$

$$\theta = (Ng-NF)/(NF-NC) \quad (b)$$

where a refractive index at the g-line is denoted by Ng, a refractive index at the F-line is denoted by NF, a refractive index at the d-line is denoted by Nd, and a refractive index at the C-line is denoted by NC. As illustrated in FIG. 8, the existing optical material is distributed in the region having narrow partial dispersion ratio θ with respect to the Abbe number ν, and there is a tendency that the partial dispersion ratio θ increases as the Abbe number ν decreases.

A correction condition of chromatic aberration of a thin lens system constituted of two lenses G1 and G2 having refracting powers φ1 and φ2 and Abbe numbers of materials ν1 and ν2, respectively (combined refracting power φ) is expressed by the following expression.

$$\phi 1/\nu 1 + \phi 2/\nu 2 = E \quad (c)$$

Here, φ is expressed as follows.

$$\phi = \phi 1 + \phi 2 \quad (d)$$

If E=0 is satisfied in the expression (c), an optical image formation position is identical between the C-line and the F-line.

In FIG. 7, as to the achromatization of lens unit LP having a positive refractive power, a material having a large Abbe number ν1 is used for the positive lens G1, and a material having a small Abbe number ν2 is used for the negative lens G2. Therefore, the positive lens G1 has a small partial dispersion ratio θ1, and the negative lens G2 has a large partial dispersion ratio θ2 as illustrated in FIG. 8. If the chromatic aberration is corrected at the F-line and the C-line, the image formation point at the g-line is shifted to the image side. This deviation amount defined as a secondary spectrum amount Δ is expressed by the following expression.

$$\Delta = -(1/\phi) \cdot (\theta 1 - \theta 2)/(\nu 1 - \nu 2) \tag{7}$$

In other words, the secondary spectrum amount Δ is large in the part where the refractive power is small. In addition, longitudinal chromatic aberration increases in proportion with a square of height of the on-axis marginal light beam. Therefore, in general, the remaining amount of the secondary spectrum is large at the part where the on-axis marginal light beam is high.

Therefore, the secondary spectrum amount Δ becomes conspicuous in the first lens unit L1 which has a small refractive power and in which the on-axis marginal light beam passes a high position on the telephoto side. Therefore, if the upper limit of the conditional expression (1) is exceeded, the amount of the secondary spectrum generated in the first lens unit F on the telephoto side increases so that it becomes difficult to correct the longitudinal chromatic aberration appropriately. In particular, a range exceeding (more than) $-1.30 \times 10^{-3}$ in the conditional expression (1) is desirable, because the correction effect of the longitudinal chromatic aberration is high in this range.

It is preferable to set the conditional expression (1) as follows.

$$-1.747 \times 10^{-3} < (\theta pa - \theta n)/(\nu pa - \nu n) < -1.220 \times 10^{-3} \tag{1a}$$

The conditional expression (2) defines the refractive power of the negative lens constituting the first lens unit F, so as to facilitate downsizing of the first lens unit F and realizing a wide field angle of the entire system. If the lower limit of the conditional expression (2) is exceeded, the refractive power of the lens unit in the first lens unit F is decreased, so that it becomes difficult to increase the refractive power of the entire first lens unit F. Therefore, an effective diameter of the entire lens increases resulting in an increase of a total length of the lens system (distance from the first lens surface to the image plane). In addition, it becomes difficult to set a principal point of the first lens unit F on the image side closer to the image side, so that it becomes difficult to realize a wide field angle. It is more preferable to set the conditional expression (2) as follows.

$$10.0 \times 10^{-3} (1/mm) < |\phi n| < 14.0 \times 10^{-3} (1/mm) \tag{2a}$$

If each element is set as described above, according to each embodiment, it is possible to obtain a zoom lens system having a small size and light weight, in which a field angle is larger than 66 degrees at the wide angle end, and a zoom ratio of 1:10 or higher can be realized, while the longitudinal chromatic aberration can be corrected appropriately on the telephoto side. In each embodiment, it is more preferable to satisfy the condition expressed by the expression (3) below, where the focal length of the first lens unit F is denoted by f1, and the focal length of the second lens unit V is denoted by f2.

$$|f1/f2| < 4.7 \tag{3}$$

The conditional expression (3) defines a ratio between the focal length of the first lens unit F and the focal length of the second lens unit V. If the upper limit of the conditional expression (3) is exceeded, the refractive power of the first lens unit F becomes too small to realize a wide field angle. In addition, the refractive power of the second lens unit V becomes so large that a variation of the aberration during zooming increases inappropriately. It is more preferable to set the conditional expression (3) as follows.

$$3.50 < |f1/f2| < 4.9 \tag{3a}$$

It is preferable to satisfy the condition expressed by the expression below, where a power of the first lens unit F is denoted by $\phi 1$.

$$0.65 < \left|\frac{\phi_n}{\phi_1}\right| < 0.80 \tag{5}$$

If the upper limit value of the conditional expression (5) is exceeded so that the power of the negative lens becomes too large, a power of each lens in the first lens unit F becomes large, so that the aberration correction becomes difficult.

In addition, if the lower limit value of the conditional expression (5) is exceeded so that the power of the negative lens becomes too small, it becomes difficult to set a principal point of the first lens unit F on the image side closer to the image side, and it becomes difficult to realize a wide field angle.

It is more preferable to set the conditional expression (5) as follows.

$$0.68 < \left|\frac{\phi_n}{\phi_1}\right| < 0.75 \tag{5a}$$

When the zoom lens system of the present invention is used for an image pickup apparatus having a photoelectric conversion element such as a CCD, a focal length of the entire system at the wide angle end is denoted by fw, and a diagonal length of an effective surface of the photoelectric conversion element is denoted by IS. In this case, it is preferable to satisfy the condition expressed by the following expression.

$$|fw/IS| < 0.77 \tag{4}$$

The conditional expression (4) defines a ratio between the focal length at the wide angle end and an image size (diagonal length of the effective surface) of the image plane (photoelectric conversion element). If the conditional expressions (1) and (2) and the conditional expression (3) are satisfied in the range that satisfies the conditional expression (4), the longitudinal chromatic aberration can appropriately be corrected on the telephoto side, and a small size and a wide field angle of the entire system can be realized easily.

It is more appropriate to set the conditional expression (4) as follows.

$$0.650 < |fw/IS| < 0.768 \tag{4a}$$

Next, other features of each embodiment than those described above are described. First, the lens structure of the first lens unit F in Embodiment 1 is described. The first lens unit F corresponds to the first lens surface to the eighth lens surface in the numerical embodiments. The first lens unit F includes a negative lens, a positive lens, a positive lens, and a positive lens, which are arranged in this order from the object side to the image side. A focus lens unit is denoted by Fa. Numerical Embodiment 1 satisfies all of the conditional expressions (1) to (5). Embodiment 1 realizes a high magnification (zoom ratio) of 1:14 and a wide picture angle (field angle) of 66.2° at the wide angle end. Further, on the telephoto side, high optical performance is obtained with the longitudinal chromatic aberration being corrected appropriately.

The lens structure of the first lens unit F in Embodiment 2 is described. The first lens unit F corresponds to the first lens surface to the eighth lens surface in the numerical embodiments. The first lens unit F includes a negative lens, a positive lens, a positive lens, and a positive lens, which are arranged in this order from the object side to the image side. Numerical Embodiment 2 satisfies all of the conditional expressions (1) to (5). Embodiment 2 realizes a high magnification (zoom ratio) of 1:12 and a wide picture angle (field angle) of 71.1° at the wide angle end. Further, on the telephoto side, high optical performance is obtained with the longitudinal chromatic aberration being corrected appropriately.

First, the lens structure of the first lens unit F in Embodiment 3 is described. The first lens unit F corresponds to the first lens surface to the eighth lens surface in the numerical embodiments. The first lens unit F includes a negative lens, a positive lens, a positive lens, and a positive lens, which are arranged in this order from the object side to the image side. A focus lens unit is denoted by Fa. Numerical Embodiment 3 satisfies all of the conditional expressions (1) to (5). Embodiment 3 realizes a high magnification (zoom ratio) of 1:12 and a wide picture angle (field angle) of 66.2° at the wide angle end. Further, on the telephoto side, high optical performance is obtained with the longitudinal chromatic aberration being corrected appropriately.

Figure 9:
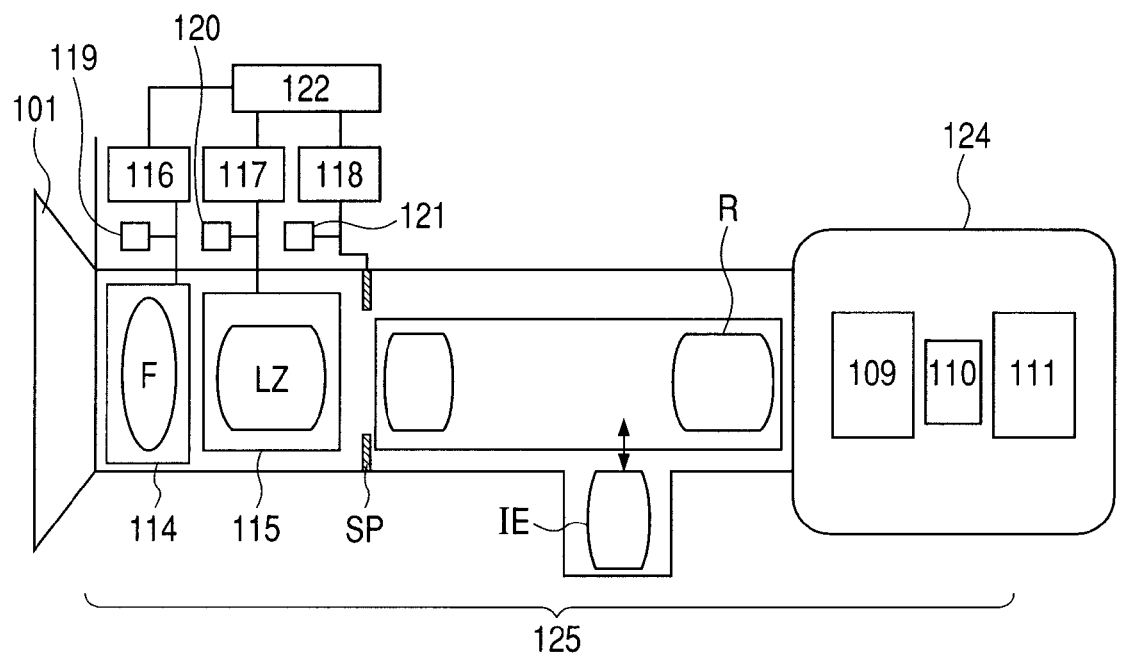
FIG. 9 is a schematic diagram of a main part of an image pickup apparatus according to the present invention.

FIG. 9 is a schematic diagram of a main part of an image pickup apparatus (television (TV) camera system) using the zoom lens system according to each of the Embodiments 1 to 3 as an image pickup optical system. In FIG. 9, a zoom lens system 101 according to any one of Embodiments 1 to 3 and a camera 124 are provided. The zoom lens system 101 is detachably attached to the camera 124. An image pickup apparatus 125 has a structure in which the zoom lens system 101 is attached to the camera 124. The zoom lens system 101 includes a first lens unit F, a zooming section LZ, and a fourth lens unit R for imaging. The first lens unit F includes a focusing lens unit Fa. The zooming section LZ includes a second lens unit V which moves on the optical axis for zooming and a third lens unit C which moves on the optical axis so as to correct image plane variation due to zooming.

The zoom lens system 101 includes the aperture stop SP. The fourth lens unit R includes a lens unit (zooming optical system) IE which may be inserted onto or removed from the optical path. The lens unit IE is provided to shift in the focal length range of the entire system of the zoom lens system 101. Drive mechanisms 114 and 115 such as helicoids or cams drive the first lens unit F and the zooming section LZ, respectively, in the optical axis direction. Motors (drive units) 116 to 118 are provided to electrically drive the drive mechanisms 114 and 115 and the aperture stop SP. Detectors 119 to 121 such as encoders, potentiometers, or photosensors detect positions of the first lens unit F and the zooming section LZ on the optical axis and a stop diameter of the aperture stop SP.

The camera 124 includes a glass block 109 corresponding to an optical filter or a color separation prism, and a solid-state image pickup element (photoelectric transducer) 110 such as a CCD sensor or a CMOS sensor, for receiving a subject image formed by the zoom lens system 101. CPUs 111 and 122 perform various drive controls of the camera 124 and the main body of the zoom lens system 101, respectively. When the zoom lens system according to the present invention is applied to the TV camera system as described above, the image pickup apparatus having high optical performance is realized. As described above, preferred embodiments of the present invention are described, but it is understood that the present invention is not limited to these embodiments, which can be modified and changed variously within the spirit thereof.

Hereinafter, Numerical Embodiments 1 to 3 corresponding to Embodiments 1 to 3 of the present invention are described. In the respective numerical embodiments, a surface number "i" is counted from the object side. In addition, r(i) indicates a curvature radius of an i-th surface counted from the object side, and d(i) indicates an interval between the i-th surface and an (i+1)-th surface which are counted from the object side. Further, nd(i) and vd(i) indicate a refractive index and an Abbe number of an i-th optical material, respectively. Last three surfaces correspond to a glass block such as a filter. Table 1 shows a correspondence relationship between the respective embodiments and the conditional expressions described above.

Numerical Embodiment 1 Unit: mm

| Surface data | | | | | | | |
|---|---|---|---|---|---|---|---|
| Surface Number | r | d | nd | vd | θgF | Effective diameter | Focal length |
| 1 | −280.52378 | 2.20000 | 1.846660 | 23.78 | 0.6034 | 62.669 | −83.243 |
| 2 | 95.72186 | 5.37139 | 1.000000 | 0.00 | 0.0000 | 60.316 | 0.000 |
| 3 | 129.29033 | 10.08155 | 1.487490 | 70.23 | 0.5300 | 60.866 | 133.873 |
| 4 | −129.29033 | 6.06658 | 1.000000 | 0.00 | 0.0000 | 60.666 | 0.000 |
| 5 | 136.82598 | 8.38271 | 1.651597 | 58.55 | 0.5426 | 58.434 | 119.324 |
| 6 | −177.38635 | 0.20000 | 1.000000 | 0.00 | 0.0000 | 57.558 | 0.000 |
| 7 | 49.19551 | 5.38151 | 1.772499 | 49.60 | 0.5521 | 50.575 | 106.956 |
| 8 | 114.97449 | (Variable) | 1.000000 | 0.00 | 0.0000 | 49.600 | 0.000 |
| 9 | 84.41111 | 0.80000 | 1.882997 | 40.76 | 0.5667 | 20.604 | −14.817 |
| 10 | 11.33433 | 5.21397 | 1.000000 | 0.00 | 0.0000 | 16.668 | 0.000 |
| 11 | −43.13950 | 0.70000 | 1.882997 | 40.76 | 0.5667 | 16.483 | −27.110 |
| 12 | 54.90768 | 1.41261 | 1.000000 | 0.00 | 0.0000 | 16.604 | 0.000 |
| 13 | 25.48191 | 3.88495 | 1.846660 | 23.78 | 0.6205 | 17.520 | 19.746 |
| 14 | −46.51763 | 0.19984 | 1.000000 | 0.00 | 0.0000 | 17.314 | 0.000 |
| 15 | −86.13469 | 0.70000 | 1.834807 | 42.72 | 0.5636 | 16.946 | −47.500 |
| 16 | 74.51812 | (Variable) | 1.000000 | 0.00 | 0.0000 | 16.584 | 0.000 |
| 17 | −24.76433 | 0.60000 | 1.834000 | 37.16 | 0.5775 | 13.159 | −18.529 |
| 18 | 42.27023 | 1.80160 | 1.922860 | 18.90 | 0.6495 | 13.823 | 40.043 |
| 19 | −318.79066 | (Variable) | 1.000000 | 0.00 | 0.0000 | 14.156 | 0.000 |
| 20 | 0.00000 | 3.09512 | 1.000000 | 0.00 | 0.0000 | 14.112 | 0.000 |

-continued

| | | | | | | | |
|---|---|---|---|---|---|---|---|
| 21 | 6259.58361 | 3.60207 | 1.698947 | 30.13 | 0.6029 | 15.754 | 30.765 |
| 22 | −21.74167 | 1.51333 | 1.000000 | 0.00 | 0.0000 | 16.359 | 0.000 |
| 23 | −169.04300 | 5.21654 | 1.548141 | 45.79 | 0.5685 | 16.224 | 24.833 |
| 24 | −12.79678 | 0.75000 | 1.882997 | 40.76 | 0.5667 | 16.234 | −14.569 |
| 25 | −1196.00951 | 3.50013 | 1.000000 | 0.00 | 0.0000 | 17.259 | 0.000 |
| 26 | 25.88573 | 5.40539 | 1.518229 | 58.90 | 0.5456 | 20.247 | 35.989 |
| 27 | −62.86568 | 17.47813 | 1.000000 | 0.00 | 0.0000 | 20.321 | 0.000 |
| 28 | 120.46200 | 0.52500 | 1.846660 | 23.78 | 0.6205 | 17.972 | −25.050 |
| 29 | 18.14901 | 1.38902 | 1.000000 | 0.00 | 0.0000 | 17.633 | 0.000 |
| 30 | 22.95995 | 4.83560 | 1.518229 | 58.90 | 0.5456 | 18.528 | 27.038 |
| 31 | −33.70951 | 0.19994 | 1.000000 | 0.00 | 0.0000 | 18.790 | 0.000 |
| 32 | 19.28181 | 5.23666 | 1.487490 | 70.23 | 0.5300 | 18.637 | 34.734 |
| 33 | −130.19637 | 4.72500 | 1.000000 | 0.00 | 0.0000 | 18.018 | 0.000 |
| 34 | 0.00000 | 21.00000 | 1.701536 | 41.24 | 0.5766 | 30.000 | 0.000 |
| 35 | 0.00000 | 6.75000 | 1.516330 | 64.14 | 0.5352 | 30.000 | 0.000 |
| 36 | 0.00000 | 0.00000 | 1.000000 | 0.00 | 0.0000 | 30.000 | 0.000 |

Various data
Zoom ratio 14.00

| | Wide angle | Intermediate | Telephoto |
|---|---|---|---|
| Focal length | 4.60 | 23.00 | 64.40 |
| F number | 1.60 | 1.60 | 1.60 |
| Field angle | 33.11 | 7.43 | 2.67 |
| Image height | 3.00 | 3.00 | 3.00 |
| Total lens length | 193.63 | 193.63 | 193.63 |
| BF | 5.70 | 5.70 | 5.70 |
| d8 | 0.98 | 36.39 | 46.42 |
| d16 | 47.04 | 7.92 | 3.50 |
| d19 | 1.68 | 5.39 | −0.22 |
| d36 | 5.70 | 5.70 | 5.70 |
| Entrance pupil position | 37.21 | 164.19 | 331.98 |
| Exit pupil position | 58.24 | 58.24 | 58.24 |
| Front principal point position | 42.22 | 197.26 | 475.32 |
| Rear principal point position | 1.10 | −17.30 | −58.70 |

Zoom lens unit data

| Unit | First surface | Focal length | Lens structure length | Front principal point position | Rear principal point position |
|---|---|---|---|---|---|
| 1 | 1 | 60.00 | 37.68 | 26.66 | 3.75 |
| 2 | 9 | −14.20 | 12.91 | 0.27 | −10.12 |
| 3 | 17 | −35.00 | 2.40 | −0.15 | −1.42 |
| 4 | 20 | 34.04 | 85.22 | 48.43 | −56.34 |

<Description of Symbols>
r: curvature
d: interval
nd: refractive index in d line
vd: Abbe number in d line
θgF: partial dispersion ratio in g line and F line
BF: back focus Numerical Embodiment 2 Unit: mm Surface data

| Surface Number | r | d | nd | vd | θgF | Effective diameter | Focal length |
|---|---|---|---|---|---|---|---|
| 1 | −661.56817 | 2.20000 | 1.846660 | 23.78 | 0.6034 | 76.290 | −95.804 |
| 2 | 93.63791 | 6.25604 | 1.000000 | 0.00 | 0.0000 | 72.506 | 0.000 |
| 3 | 131.92925 | 11.98501 | 1.433870 | 95.10 | 0.5373 | 73.004 | 153.774 |
| 4 | −131.92925 | 6.46370 | 1.000000 | 0.00 | 0.0000 | 72.859 | 0.000 |
| 5 | 137.77074 | 7.17227 | 1.592400 | 68.30 | 0.5456 | 69.394 | 177.675 |
| 6 | −443.82912 | 0.20000 | 1.000000 | 0.00 | 0.0000 | 68.902 | 0.000 |
| 7 | 60.64315 | 7.76509 | 1.816000 | 46.62 | 0.5568 | 62.334 | 96.868 |
| 8 | 241.42781 | (Variable) | 1.000000 | 0.00 | 0.0000 | 61.362 | 0.000 |
| 9 | 163.80936 | 0.80000 | 1.882997 | 40.76 | 0.5667 | 22.657 | −14.782 |

-continued

| | | | | | | | |
|---|---|---|---|---|---|---|---|
| 10 | 12.12689 | 5.63939 | 1.000000 | 0.00 | 0.0000 | 18.082 | 0.000 |
| 11 | −47.68675 | 0.70000 | 1.882997 | 40.76 | 0.5667 | 17.937 | −28.989 |
| 12 | 56.34539 | 1.58223 | 1.000000 | 0.00 | 0.0000 | 18.115 | 0.000 |
| 13 | 27.31755 | 4.57329 | 1.846660 | 23.78 | 0.6205 | 19.304 | 18.753 |
| 14 | −35.82783 | 0.19979 | 1.000000 | 0.00 | 0.0000 | 19.126 | 0.000 |
| 15 | −79.93199 | 0.70000 | 1.834000 | 37.16 | 0.5775 | 18.367 | −37.834 |
| 16 | 52.89552 | (Variable) | 1.000000 | 0.00 | 0.0000 | 17.798 | 0.000 |
| 17 | −24.65293 | 0.60000 | 1.834000 | 37.16 | 0.5775 | 12.325 | −18.844 |
| 18 | 44.61161 | 1.68242 | 1.922860 | 18.90 | 0.6495 | 12.912 | 41.525 |
| 19 | −292.19370 | (Variable) | 1.000000 | 0.00 | 0.0000 | 13.237 | 0.000 |
| 20 | 0.00000 | 3.09507 | 1.000000 | 0.00 | 0.0000 | 14.161 | 0.000 |
| 21 | 6256.61087 | 3.59432 | 1.698947 | 30.13 | 0.6029 | 15.776 | 30.962 |
| 22 | −21.88155 | 1.50922 | 1.000000 | 0.00 | 0.0000 | 16.372 | 0.000 |
| 23 | −155.27028 | 5.17840 | 1.548141 | 45.79 | 0.5685 | 16.224 | 25.133 |
| 24 | −12.86446 | 0.75000 | 1.882997 | 40.76 | 0.5667 | 16.234 | −14.734 |
| 25 | −780.13607 | 3.50009 | 1.000000 | 0.00 | 0.0000 | 17.241 | 0.000 |
| 26 | 26.08531 | 5.34296 | 1.518229 | 58.90 | 0.5456 | 20.149 | 36.363 |
| 27 | −64.05592 | 18.36906 | 1.000000 | 0.00 | 0.0000 | 20.219 | 0.000 |
| 28 | 113.65935 | 0.52500 | 1.846660 | 23.78 | 0.6205 | 17.781 | −25.405 |
| 29 | 18.19822 | 1.37301 | 1.000000 | 0.00 | 0.0000 | 17.446 | 0.000 |
| 30 | 23.06662 | 4.70900 | 1.518229 | 58.90 | 0.5456 | 18.284 | 27.290 |
| 31 | −34.35748 | 0.19995 | 1.000000 | 0.00 | 0.0000 | 18.531 | 0.000 |
| 32 | 18.89124 | 5.27642 | 1.487490 | 70.23 | 0.5300 | 18.659 | 34.433 |
| 33 | −141.08187 | 4.72500 | 1.000000 | 0.00 | 0.0000 | 18.019 | 0.000 |
| 34 | 0.00000 | 21.00000 | 1.701536 | 41.24 | 0.5766 | 30.000 | 0.000 |
| 35 | 0.00000 | 6.75000 | 1.516330 | 64.14 | 0.5352 | 30.000 | 0.000 |
| 36 | 0.00000 | 0.00000 | 1.000000 | 0.00 | 0.0000 | 30.000 | 0.000 |

Various data
Zoom ratio 12.00

| | Wide angle | Intermediate | Telephoto |
|---|---|---|---|
| Focal length | 4.20 | 18.90 | 50.40 |
| F number | 1.60 | 1.60 | 1.59 |
| Field angle | 35.54 | 9.02 | 3.41 |
| Image height | 3.00 | 3.00 | 3.00 |
| Total lens length | 204.90 | 204.90 | 204.90 |
| BF | 5.24 | 5.24 | 5.24 |
| d8 | 1.07 | 38.68 | 50.49 |
| d16 | 52.48 | 10.53 | 1.19 |
| d19 | 1.70 | 6.04 | 3.56 |
| d36 | 5.24 | 5.24 | 5.24 |
| Entrance pupil position | 40.46 | 164.12 | 333.06 |
| Exit pupil position | 55.68 | 55.68 | 55.68 |
| Front principal point position | 45.00 | 190.10 | 433.82 |
| Rear principal point position | 1.04 | −13.66 | −45.16 |

Zoom lens unit data

| Unit | First surface | Focal length | Lens structure length | Front principal point position | Rear principal point position |
|---|---|---|---|---|---|
| 1 | 1 | 66.50 | 42.04 | 29.79 | 3.82 |
| 2 | 9 | −14.20 | 14.19 | 0.26 | 11.07 |
| 3 | 17 | 35.00 | 2.28 | 0.16 | −1.36 |
| 4 | 20 | 34.69 | 85.90 | 50.02 | −57.54 |

<Description of Symbols>
r: curvature
d: interval
nd: refractive index in d line
vd: Abbe number in d line
θgF: partial dispersion ratio in g line and F line
BF: back focus Numerical Embodiment 3 Unit: mm

Surface data

| Surface Number | r | d | nd | νd | θgF | Effective diameter | Focal length |
|---|---|---|---|---|---|---|---|
| 1 | −268.40590 | 2.20000 | 1.846660 | 23.78 | 0.6034 | 61.346 | −77.364 |
| 2 | 88.11764 | 5.50060 | 1.000000 | 0.00 | 0.0000 | 58.803 | 0.000 |
| 3 | 122.36676 | 10.11266 | 1.487490 | 70.23 | 0.5300 | 59.234 | 126.803 |
| 4 | −122.36676 | 5.30445 | 1.000000 | 0.00 | 0.0000 | 59.077 | 0.000 |
| 5 | 124.89086 | 8.22957 | 1.651597 | 58.55 | 0.5426 | 56.572 | 114.999 |
| 6 | −184.31418 | 0.20000 | 1.000000 | 0.00 | 0.0000 | 55.566 | 0.000 |
| 7 | 48.81520 | 5.56542 | 1.772499 | 49.60 | 0.5521 | 48.875 | 94.917 |
| 8 | 137.46010 | (Variable) | 1.000000 | 0.00 | 0.0000 | 47.862 | 0.000 |
| 9 | 99.81395 | 0.80000 | 1.882997 | 40.76 | 0.5667 | 21.709 | −15.065 |
| 10 | 11.75361 | 5.38628 | 1.000000 | 0.00 | 0.0000 | 17.451 | 0.000 |
| 11 | −50.63760 | 0.70000 | 1.882997 | 40.76 | 0.5667 | 17.270 | −27.346 |
| 12 | 46.97551 | 0.64658 | 1.000000 | 0.00 | 0.0000 | 17.359 | 0.000 |
| 13 | 23.69249 | 3.95382 | 1.846660 | 23.78 | 0.6205 | 18.051 | 20.428 |
| 14 | −61.35410 | 0.19958 | 1.000000 | 0.00 | 0.0000 | 17.804 | 0.000 |
| 15 | −89.45295 | 0.70000 | 1.834807 | 42.72 | 0.5636 | 17.560 | −63.581 |
| 16 | 132.80376 | (Variable) | 1.000000 | 0.00 | 0.0000 | 17.259 | 0.000 |
| 17 | −25.12196 | 0.60000 | 1.834000 | 37.16 | 0.5775 | 12.046 | −18.672 |
| 18 | 42.11771 | 1.65428 | 1.922860 | 18.90 | 0.6495 | 12.542 | 40.646 |
| 19 | −378.78520 | (Variable) | 1.000000 | 0.00 | 0.0000 | 12.820 | 0.000 |
| 20 | 0.00000 | 3.09583 | 1.000000 | 0.00 | 0.0000 | 13.389 | 0.000 |
| 21 | 6262.05135 | 3.56174 | 1.698947 | 30.13 | 0.6029 | 14.794 | 27.750 |
| 22 | −19.60454 | 1.53496 | 1.000000 | 0.00 | 0.0000 | 15.315 | 0.000 |
| 23 | 650.40562 | 5.19222 | 1.548141 | 45.79 | 0.5685 | 14.864 | 21.243 |
| 24 | −11.53040 | 0.75000 | 1.882997 | 40.76 | 0.5667 | 14.637 | −11.265 |
| 25 | 77.96311 | 3.50037 | 1.000000 | 0.00 | 0.0000 | 15.444 | 0.000 |
| 26 | 24.91902 | 5.08856 | 1.518229 | 58.90 | 0.5456 | 18.445 | 34.125 |
| 27 | −57.45277 | 25.77382 | 1.000000 | 0.00 | 0.0000 | 18.678 | 0.000 |
| 28 | 164.72122 | 0.52500 | 1.846660 | 23.78 | 0.6205 | 18.339 | −27.884 |
| 29 | 20.79669 | 1.45689 | 1.000000 | 0.00 | 0.0000 | 18.449 | 0.000 |
| 30 | 27.27005 | 5.37944 | 1.518229 | 58.90 | 0.5456 | 20.007 | 27.828 |
| 31 | −28.78730 | 0.19981 | 1.000000 | 0.00 | 0.0000 | 20.609 | 0.000 |
| 32 | 19.52332 | 6.26139 | 1.487490 | 70.23 | 0.5300 | 21.643 | 34.789 |
| 33 | −118.59879 | 4.72500 | 1.000000 | 0.00 | 0.0000 | 20.881 | 0.000 |
| 34 | 0.00000 | 21.00000 | 1.701536 | 41.24 | 0.5766 | 30.000 | 0.000 |
| 35 | 0.00000 | 6.75000 | 1.516330 | 64.14 | 0.5352 | 30.000 | 0.000 |
| 36 | 0.00000 | 0.00000 | 1.000000 | 0.00 | 0.0000 | 30.000 | 0.000 |

Various data
Zoom ratio 12.00

| | Wide angle | Intermediate | Telephoto |
|---|---|---|---|
| Focal length | 4.60 | 20.70 | 55.20 |
| F number | 1.60 | 1.60 | 1.60 |
| Field angle | 33.11 | 8.25 | 3.11 |
| Image height | 3.00 | 3.00 | 3.00 |
| Total lens length | 198.38 | 198.38 | 198.38 |
| BF | 5.46 | 5.46 | 5.46 |
| d8 | 0.98 | 31.88 | 41.17 |
| d16 | 40.21 | 6.64 | 4.09 |
| d19 | 5.18 | 7.85 | 1.10 |
| d36 | 5.46 | 5.46 | 5.46 |
| Entrance pupil position | 37.07 | 143.85 | 284.41 |
| Exit pupil position | 33.11 | 33.11 | 33.11 |
| Front principal point position | 42.44 | 180.05 | 449.80 |
| Rear principal point position | 0.86 | −15.24 | −49.74 |

Zoom lens unit data

| Unit | First surface | Focal length | Lens structure length | Front principal point position | Rear principal point position |
|---|---|---|---|---|---|
| 1 | 1 | 55.00 | 37.11 | 25.90 | 3.76 |
| 2 | 9 | −15.00 | 12.39 | 0.29 | −9.41 |

-continued

| 3 | 17 | −35.00 | 2.25 | −0.13 | −1.31 |
| 4 | 20 | 46.23 | 94.80 | 81.59 | −73.57 |

<Description of Symbols>
r: curvature
d: interval
nd: refractive index in d line
vd: Abbe number in d line
θgF: partial dispersion ratio in g line and F line
BF: back focus

TABLE 1

Values corresponding to conditional expressions in
Numerical Embodiments 1 to 3

| Conditional expression | Conditional expression | Embodiment 1 | Embodiment 2 | Embodiment 3 |
|---|---|---|---|---|
| (1) | $(\theta pa - \theta na)/(\nu pa - \nu na)$ | $1.745 \times 10^{-3}$ | $-1.233 \times 10^{-3}$ | $-1.745 \times 10^{-3}$ |
| (2) | $|\Phi n|(1/mm)$ | $12.01 \times 10^{-3}$ | $10.44 \times 10^{-3}$ | $12.93 \times 10^{-3}$ |
| (3) | $|f1/f2|$ | 4.23 | 4.68 | 3.67 |
| (4) | $|fw/IS|$ | 0.767 | 0.700 | 0.767 |
| (5) | $|\Phi_n/\Phi_1|$ | 0.721 | 0.694 | 0.711 |

According to the embodiments described above, it is possible to obtain a zoom lens system (image pickup apparatus) which can easily realize a high zoom ratio, a small size, and light weight while correcting the longitudinal chromatic aberration appropriately on the telephoto side.

While the present invention has been described with reference to exemplary embodiments, it is to be understood that the invention is not limited to the disclosed exemplary embodiments. The scope of the following is to be accorded the broadest interpretation so as to encompass all such modifications and equivalent structures and functions.

This application claims the benefit of Japanese Patent Application No. 2009-188462, filed Aug. 17, 2009, which is hereby incorporated by reference herein in its entirety.

What is claimed is:

1. A zoom lens system comprising, in order of from an object side to an image side:
    a first lens unit having a positive refractive power, which does not move for zooming;
    a second lens unit having a negative refractive power, which moves during zooming;
    a third lens unit having a negative refractive power, which moves during zooming; and
    a fourth lens unit having a positive refractive power, which does not move for zooming, wherein:
    the first lens unit includes a negative lens, a positive lens, a positive lens, and a positive lens arranged in this order from the object side to the image side, and
    when an Abbe number ν and a partial dispersion ratio θ of a material of the negative lens in the first lens unit are denoted respectively by νn and θn, an average value of Abbe numbers ν and an average value of partial dispersion ratios θ of materials of the positive lenses in the first lens unit are denoted respectively by νpa and θpa, and a refractive power of the negative lens in the first lens unit is denoted by φn, conditions expressed by the following expressions are satisfied:

$-1.75 \times 10^{-3} < (\theta pa - \theta n)/(\nu pa - \nu n)$; and $9.1 \times 10^{-3} (1/mm) < |\phi n|$.

2. A zoom lens system according to claim 1, wherein when a focal length of the first lens unit is denoted by f1, and a focal length of the second lens unit is denoted by f2, a condition expressed by the following expression is satisfied:

$|f1/f2| < 4.7$.

3. An image pickup apparatus comprising:
    a zoom lens system; and
    a photoelectric conversion element which receives an optical image formed by the zoom lens system so as to perform photoelectric conversion thereof, wherein:
    the zoom lens system comprises, in order of from an object side to the photoelectric conversion element side
    a first lens unit having a positive refractive power, which does not move for zooming;
    a second lens unit having a negative refractive power, which moves during zooming;
    a third lens unit having a negative refractive power, which moves during zooming; and
    a fourth lens unit having a positive refractive power, which does not move for zooming;
    the first lens unit includes a negative lens, a positive lens, a positive lens, and a positive lens arranged in this order from the object side to an image side; and
    when an Abbe number ν and a partial dispersion ratio θ of a material of the negative lens in the first lens unit are denoted respectively by νn and θn, an average value of Abbe numbers ν and an average value of partial dispersion ratios θ of materials of the positive lenses in the first lens unit are denoted respectively by νpa and θpa, and a refractive power of the negative lens in the first lens unit is denoted by φn, conditions expressed by the following expressions are satisfied:

$-1.75 \times 10^{-3} < (\theta pa - \theta n)/(\nu pa - \nu n)$; and $9.1 \times 10^{-3} (1/mm) < |\phi n|$.

4. An image pickup apparatus according to claim 3, wherein when a focal length of the entire system at a wide angle end is denoted by fw, and a diagonal length of an effective surface of the photoelectric conversion element is denoted by IS, a condition expressed by the following expression is satisfied:

$|fw/IS| < 0.77$.

5. An image pickup apparatus according to claim 3, wherein when a focal length of the first lens unit is denoted by f1, and a focal length of the second lens unit is denoted by f2, a condition expressed by the following expression is satisfied:

$|f1/f2| < 4.7$.

* * * * *